G. O. CURME, Jr.
METHOD OF SEPARATING ACETYLENE AND HYDROGEN.
APPLICATION FILED JULY 20, 1915.
1,181,116.  Patented May 2, 1916.
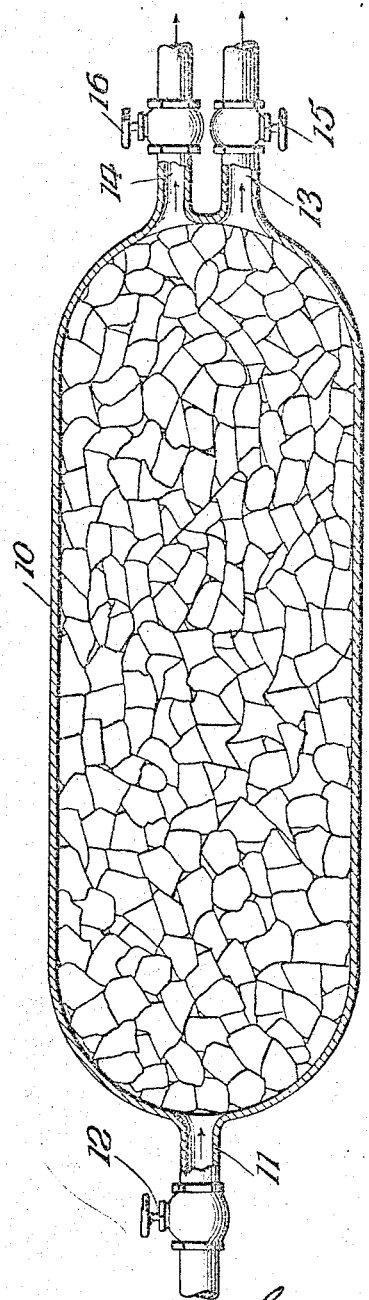
Witnesses
Inventor
George O. Curme, Jr.
By Bradford & Doolittle,
Attorneys

UNITED STATES PATENT OFFICE.

GEORGE O. CURME, JR., OF PITTSBURGH, PENNSYLVANIA, ASSIGNOR TO THE PREST-O-LITE COMPANY, INC., OF INDIANAPOLIS, INDIANA, A CORPORATION OF NEW YORK.

METHOD OF SEPARATING ACETYLENE AND HYDROGEN.

1,181,116.  Specification of Letters Patent.  Patented May 2, 1916.

Application filed July 20, 1915. Serial No. 40,972.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Methods of Separating Acetylene and Hydrogen, of which the following is a specification.

The object of my said invention is to provide a method and means for the separation of various gases in a gaseous mixture containing acetylene, ethylene, methane and hydrogen with traces of other gaseous substances, such as impurities, whereby the available gases are separated one from another in a form and condition in which they are available for successful commercial use, all as will be hereinafter more fully described and claimed.

The accompanying drawing illustrates an apparatus for carrying out my process, although it will be understood as shown merely to enable the process to be more readily understood and not with the intention of illustrating an apparatus which is considered perfect for the purpose or even of the form that will probably be most largely employed, as its form and arrangement is susceptible to a large variety of modifications in order to suit it to the capacity of the apparatus with which it is to be used and also to the locality or space in which it is desired to locate it.

In such apparatus 10 represents a vessel which may be of any appropriate form and size for the particular apparatus with which it is to be used. An inlet pipe 11 leads from the source of supply of the gaseous mixture. A controlling valve 12 is mounted in said inlet pipe. Two outlet pipes 13 and 14 respectively, lead from the opposite end of said vessel, the pipe 13 having a valve 15 for controlling the flow therethrough and the pipe 14 having a corresponding valve 16. The pipe 13 is intended to lead to a hydrogen holder or tank and pipe 14 to an acetylene holder or receiver. The interior of the vessel 10 may be divided by partitions (not shown) arranged in serpentine form whereby the gases in traveling from the inlet to the outlet, travel in a serpentine path. Said vessel is filled with charcoal and if arranged with the internal partitions above mentioned, the spaces between the partitions will be filled with such material so that the gases in passing from the inlet to the outlet, pass in contact with the charcoal at all times throughout the serpentine passage. While any grade of charcoal found suitable may be employed, wood charcoal, preferably pine, well burnt, or completely carbonized, is preferred for the most efficient work.

The gaseous substance which this process and apparatus are designed to separate is that product produced by the process forming the subject matter of my other application, filed July 20, 1915. This product as described in said application consists of acetylene, ethylene, methane, hydrogen and traces of other substances, the valuable constituents of which are the acetylene and hydrogen, the ethylene, so far as this process is concerned, going with the acetylene.

In carrying out my process, an apparatus such as shown and described, or one of any other suitable arrangement, is connected with the container in which the gaseous substance before mentioned is stored. The pipes 13 and 14 are connected to the receivers arranged to receive the respective gases. The apparatus is used in a room of normal or "room" temperature or may be in a room where the temperature is artificially reduced, in which case higher efficiency may be attained, but the sharpness of the separation would be the same. By "room" temperature I mean the ordinary working temperature of the room in which the apparatus is located, which, or a lower temperature, has been found to produce good results. The charcoal, having an affinity for the acetylene and ethylene, takes up or absorbs said gases, retaining them within the vessel 10, while the hydrogen and other gases pass through the vessel and out the pipe 13 unretarded, and unchanged. This process continues until the capacity of the charcoal within the vessel is fully utilized or until it has taken up all of the acetylene and ethylene gases, which such a quantity of charcoal is capable of containing. This can be determined by a test solution of appropriate chemicals attached to the outlet pipe 13, which is very simple and will show a change in color immediately on the passing of the first particle of acetylene gas. Valve 12 is then immediately closed to stop the inflow of the gaseous mixture. The valve 15 is closed to prevent the outflow of the acetylene with the hydrogen, valve 16 is opened and heat is then applied to the vessel 10, raising its temperature to around 200° C., at which temperature all of the acetylene and ethylene contained in the charcoal will be driven out and will escape through the outlet pipe 14 to the acetylene container. When the acetylene has been completely exhausted from the charcoal in vessel 10, said charcoal, as soon as reduced to the appropriate temperature, is ready for another operation. The valve 16 is closed, the valves 15 and 12 are opened, and the operation proceeds as before. In this way the process of separation may continue indefinitely or so long as there is any supply of the gaseous mixture flowing from the storage container through pipe 11. It will be understood, of course, that in this operation the gas mixture coming through pipe 11 comes under some pressure from the holder containing it. Also that the acetylene holder into which pipe 14 discharges may be connected with a pump by which the acetylene may be drawn from vessel 10 after being freed from the charcoal by heat, or by a vacuum created in said holder. All of these details may be varied and adapted to the particular place and apparatus, as will be readily understood.

While the use of charcoal in the separation of gases is well known in the science of chemistry and no claim is therefore made to the basic principle, yet it is believed that the application of this known affinity of charcoal for certain gases to this particular use, is entirely new and that the method of its use is new, inasmuch as the particular gaseous product which the above described process is designed to separate has in itself never before existed, so far as has been ascertained. The acetylene is the chief constituent of the gases taken up by the charcoal and given off by the process of heating, the ethylene contained therein being a comparatively small quantity and believed to in no way impair the value of the acetylene for such uses as it is commonly employed for. It is possible, however, to separate the ethlyene from the acetylene by an additional process, should it be found necessary to do so. The hydrogen is the other valuable constituent of the combination and may be used for various purposes in the condition in which it passes out from the vessel 10 through pipe 13, notwithstanding it is not chemically pure. I wish to emphasize the fact, however, that it is free from all impurities of the type known as catalytic "poisons" so that it is especially well adapted for use in catalytic hydrogenations.

Having thus fully described my said invention, what I claim as new and desire to secure by Letters Patent, is:

1. The process of separating a gaseous mixture containing acetylene, ethylene, hydrogen and traces of other gaseous substances which consists in passing said mixture over a body of charcoal at "room" temperature or below, directing the hydrogen into a separate container, then heating the charcoal and directing the acetylene into another container, substantially as set forth.

2. The process of separating a gaseous mixture containing acetylene and hydrogen with other gaseous substances which consists in passing the mixture through a body of charcoal confined in a container, allowing the hydrogen and such substances as are not taken up by the charcoal to flow from said container, then closing the outlet for the hydrogen and the inlet for the mixture, opening a separate outlet leading to an acetylene holder and raising the temperature of the chamber containing the charcoal until the acetylene is expelled from said charcoal into said container, substantially as set forth.

3. The process of separating the gases comprising a gaseous mixture containing acetylene and hydrogen which consists in passing said mixture through a vessel containing charcoal at room temperature or below, allowing the hydrogen to flow freely through said vessel until a quantity of acetylene has been taken up by said charcoal, then closing the inlet for the gaseous mixture and the outlet for the hydrogen, opening another outlet leading to an acetylene holder, and raising the temperature of the vessel to expel the acetylene, substantially as set forth.

4. The process of separating the gases comprising a gaseous mixture containing hydrogen which consists in passing said mixture through a vessel containing charcoal of a character to remove other elements including catalytic "poisons," and passing said hydrogen to a separate container, substantially as set forth.

5. The process of separating the gases comprising a mixture containing acetylene which consists in passing said mixture through a vessel containing charcoal of a character adapted to take up said acetylene, allowing the other gases to pass out then heating said charcoal and dispelling said acetylene, substantially as set forth.

In witness whereof, I have hereunto set my hand and seal at Indianapolis, Marion county, Indiana this 17th day of July, A. D. nineteen hundred and fifteen.

GEORGE O. CURME, Jr. [L. S.]

Witnesses:
E. W. BRADFORD,
A. C. RICE.